Figure 1:
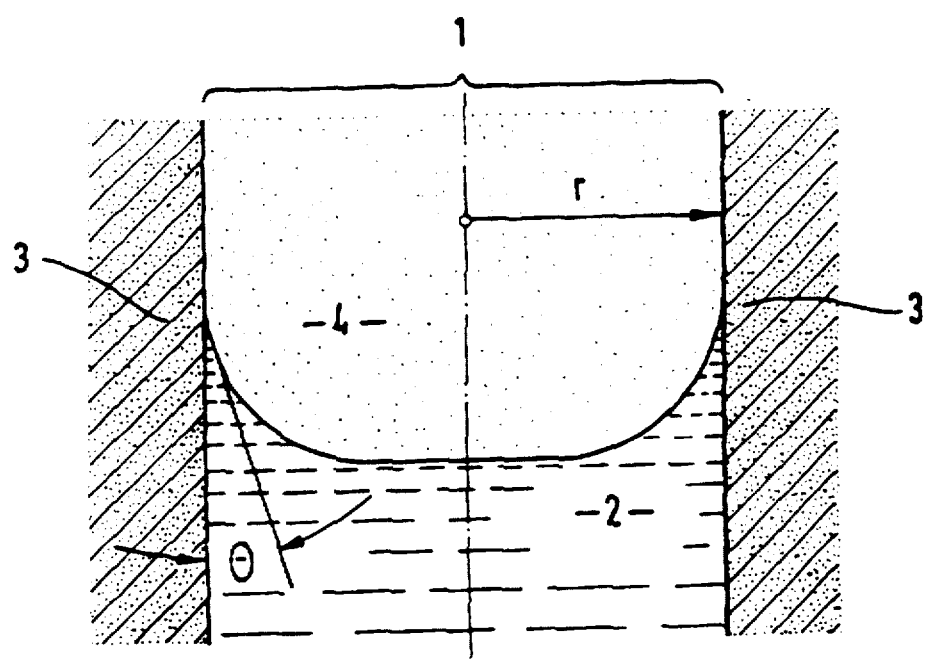

United States Patent [19]
Frank et al.

[11] Patent Number: 5,789,075
[45] Date of Patent: Aug. 4, 1998

[54] AEROGEL COMPOSITES, PROCESS FOR PRODUCING THE SAME AND THEIR USE

[75] Inventors: Dierk Frank, Hofheim; Andreas Zimmermann, Griesheim, both of Germany

[73] Assignee: Hoechst Aktiengesellschaft, Frankfurt, Germany

[21] Appl. No.: 793,178

[22] PCT Filed: Aug. 17, 1995

[86] PCT No.: PCT/EP95/03274

§ 371 Date: Feb. 20, 1997

§ 102(e) Date: Feb. 20, 1997

[87] PCT Pub. No.: WO96/06808

PCT Pub. Date: Mar. 7, 1996

[30] Foreign Application Priority Data

Aug. 29, 1994 [DE] Germany ............... 44 30 642.3

[51] Int. Cl.[6] ............... B32B 3/26; C01B 33/113; E04B 1/74
[52] U.S. Cl. ............ 428/312.6; 252/62; 252/315.01; 264/42; 264/48; 264/344; 423/325; 428/293.4; 428/317.9; 428/902; 428/920; 442/334; 442/381; 442/387; 442/391; 501/12; 501/35; 501/154
[58] Field of Search ............... 252/62, 315.01; 264/42, 48, 344; 423/325; 428/293.4, 312.6, 317.9, 902, 920; 442/334, 381, 387, 391; 501/12, 35, 154

[56] References Cited

U.S. PATENT DOCUMENTS

| 4,447,345 | 5/1984 | Kummermehr et al. . |
| 5,306,555 | 4/1994 | Rammurthi et al. . |

FOREIGN PATENT DOCUMENTS

| 0059860 | 9/1982 | European Pat. Off. . |
| 33 46 180 | 8/1985 | German Dem. Rep. . |
| 41 06 727 | 9/1992 | Germany . |
| WO 93/06044 | 4/1993 | WIPO . |
| WO 94/25149 | 11/1994 | WIPO . |

OTHER PUBLICATIONS

Chemical Abstracts, vol. 119, No. 4, Jul. 26, 1993.

*Primary Examiner*—James J. Bell
*Assistant Examiner*—Blaine R. Copenheaver
*Attorney, Agent, or Firm*—Frommer Lawrence & Haug LLP

[57] ABSTRACT

The present invention relates to mat-shaped composites having porosities above 60% and densities below 0.6 g/cm³, comprising an aerogel and fibers dispersed therein, the aerogel having cracks and the aerogel fragments enclosed by the cracks, whose average volume is 0.001 mm³ to 1 cm³, being held together by the fibers. The present invention further relates to processes for producing the composites of the invention and to their use.

19 Claims, 1 Drawing Sheet

AEROGEL COMPOSITES, PROCESS FOR PRODUCING THE SAME AND THEIR USE

The invention relates to aerogel composites, a process for producing same and their use.

Aerogels having porosities above 60% and densities below 0.6 g/cm³ have very low thermal conductivity because of their very low density and high porosity. However, the high porosity also leads to low mechanical stability not only of the gel from which the aerogel is obtained by drying but also of the dried aerogel itself. The aerogels are not very flexible and are very brittle.

Aerogels in the wider sense, i.e. in the sense of "gel with air as dispersion medium," are formed by drying a suitable gel. The term "aerogel" in this sense encompasses aerogels in the narrower sense, xerogels and cryogels. A dried gel is an aerogel in the narrow sense when the liquid of the gel is substantially removed at temperatures above the critical temperature and starting from pressures above the critical pressure. If, by contrast, the liquid of the gel is removed subcritically, for example through formation of a liquid-vapor boundary phase, the resulting gel is termed a xerogel. The term "aerogel" as used herein means, unless otherwise stated, aerogels in the wider sense, i.e. in the sense of "gel with air as dispersion medium."

On drying conventional gels, capillary forces give rise to very high stresses which, in conjunction with the low stability of the highly porous gel structure, lead to collapse in the course of drying. The capillary pressure $P_c$ which arises during the drying process is determined by the surface tension $Y_{LV}$ of the surface between pore liquid 2 and its vapor 4, the contact angle $\theta$ between liquid meniscus and pore wall 3 and the radius r of pore 1 (FIG. 1):

$$P_c = -\frac{2Y_{LV}\cos\theta}{r}$$

The collapse can be avoided if the gel is dried supercritically, as described for example in EP-A-0382310, EP-A-0018955 and U.S. Pat. No. 4,610,863, and hence the surface tension $Y_{LV}$ is reduced to zero. However, the aerogels thus produced are mechanically not very stable.

WO93/06044 discloses how fiber reinforcement of the aerogel makes it possible to obtain a fiber-reinforced, monolithic aerogel whose mechanical stability is appreciably superior to that of an unreinforced aerogel. However, the fiber reinforcement further reduces the flexibility of the fiber-reinforced, monolithic material compared with that of the pure aerogel; the resulting sheets have a high modulus of elasticity. In addition, the production process described in WO93/06044 is technically very difficult because of the need for supercritical drying. It involves drying the gel from an alcohol, for example methanol, at temperatures of 250° to 260° C. and pressures between 9.7 and 15.9 MPa.

DE-A-43 42 548 and WO 94/25149 describe processes for producing xerogels having densities below 0.3 g/cm³ and porosities above 60% where there is no need for supercritical drying of gels. The gels are modified by treatment of the internal surface area, for example by silylation in the case of SiO₂ xerogels, in such a way that they can be air dried without collapsing. The thus-produced xerogels are likewise mechanically not very stable and break easily.

There are a number of applications, for example use as a thermal insulating material for curved surfaces, where it would be desirable to be able to use aerogels in a flexible form, i.e. in the form of very flexible sheets or mats. However, the great brittleness of prior art aerogels prevents this.

It is an object of the present invention to provide very flexible aerogels having porosities above 60% and densities below 0.6/cm³.

The present invention accordingly provides a mat-shaped composite comprising an aerogel having porosities above 60% and densities below 0.6 g/cm³ and fibers dispersed therein, the aerogel having cracks and the aerogel fragments enclosed by the cracks, whose average volume is 0.001 mm³ to 1 cm³, being held together by the fibers.

The composites of this invention preferably comprise aerogel fragments having an average volume of 0.1 to 30 mm³. The smaller the average volume of the fragments of the composite, the greater the mechanical flexibility of the composite. The flexibility of the composite is additionally influenced by the flexibility of the fiber and of the aerogel. Typically, a composite of this invention is more flexible than a monolithic aerogel produced with or without fiber reinforcement according to the prior art.

Suitable aerogels for the composites of this invention are those based on metal oxides which are suitable for the sol-gel technique (C. J. Brinker, G. W. Scherer, *Sol-Gel Science*, 1990, chapters 2 and 3), such as, for example, silicon or aluminum compounds, or those based on organic substances which are suitable for the sol-gel technique, for example melamine-formaldehyde condensates (U.S. Pat. No. 5,086,085) or resorcinol-formaldehyde condensates (U.S. Pat. No. 4,873,218). They can also be based on mixtures of the abovementioned materials.

Preference is given to using aerogels comprising silicon compounds, especially SiO₂ aerogels. To reduce the radiative contribution to thermal conductivity, the aerogel can include IR opacifiers such as, for example, carbon black, titanium dioxide, iron oxides or zirconium dioxide or mixtures thereof.

For color, the gel can optionally include dyes and/or color pigments.

Particular preference is given to using xerogels; very particular preference is given to SiO₂ xerogels.

The fiber material used can be inorganic fibers, such as glass fibers or mineral fibers, organic fibers, such as polyester fibers, aramide fibers, nylon fibers or fibers of vegetable origin, and also blends thereof. The fibers can also be coated, for example polyester fibers metallized with a metal such as aluminum.

The coating can also serve to improve the bonding of the aerogel to the fibers, similarly to the coupling agents on glass fibers in glass fiber reinforced plastics.

The fire class of the composite is determined by the fire class of the aerogel and that of the fiber material. To obtain an optimum fire class (low-flammable or incombustible) for the composite, the fibers should consist of noncombustible material, for example mineral or glass fibers, or of low-flammability fibers such as melamine resin fibers. It is further possible to eliminate organic constituents of the aerogel matrix by thermal treatment without significantly altering the structure and hence the thermal conductivity of the aerogel.

To avoid raising the thermal conductivity with the incorporated fibers, a) the volume proportion of fiber should be 0.1 to 30%, preferably 0.1 to 10%, and b) the thermal conductivity of the fiber material should be as low as possible, preferably <1 W/mK.

When high volume proportions of fibers of high density, for example glass fibers, are used, the composite can also have densities of up to 0.9 g/cm³.

Suitable choice of fiber diameter and/or material makes it possible to reduce the radiative contribution to the thermal conductivity and obtain greater mechanical strength. For this the fiber diameter shall be a) 0.1 to 30 μm in the case of unmetallized fibers and/or b) preferably 0.1 to 20 μm in the case of metallized fibers.

The radiative contribution to thermal conductivity can be further reduced by using IR-opacified fibers, for example PET fibers blackened with carbon black.

The mechanical strength is further influenced by length and distribution of the fibers in the aerogel. The fibers can be incorporated for example as individual fibers randomly or ordered. In this case, to ensure a composite of sufficient strength, they should preferably be at least 1 cm in length. It is similarly possible to use webs or mats, in which case a plurality of webs or mats can be superposed, too. In the case of the layered arrangement of mats with a preferred direction, a change in the preferred direction from one layer to the next is advantageous.

The composite can be hydrophobicized by suitable modification of the pore surfaces of the aerogel.

The present invention also provides a process for producing the composites of this invention, which comprises a) preparing a sol, b) adding fibers to the sol, c) converting the sol obtained in b) into a gel, d) subjecting the gel to a suitable deformation process to introduce cracks into it in a specific manner to form fiber-connected fragments having an average volume of 0.001 mm$^3$ to 1 cm$^3$ with or without the liquid present in the gel being exchanged before, during and/or after the deformation, and e) drying the deformed gel obtained in d) in such a way that an aerogel is obtained.

The starting material for step a) is a metal oxide compound suitable for the sol-gel technique, especially silicon and aluminum compounds (C. J. Brinker, G. W. Scherer, *Sol-Gel Science*, 1990, chapters 2 and 3) such as silicon or aluminum alkoxides, waterglass, organic polycondensates based on melamine-formaldehyde resins (U.S. Pat. No. 5,086,085) or resorcinol-formaldehyde resins (U.S. Pat. No. 4,873,218) or mixtures thereof. The sol can further consist of particulate or colloidal silicon oxide or aluminum oxide. Preference is given to using silicon compounds, especially waterglass.

The sol particles carry functional groups on the surface which are capable of condensation. These groups will be known as surface groups hereinafter. Typically, sol particles composed of silicon or aluminum compounds carry hydrophilic hydroxyl groups (OH). If alkoxides are used as starting material, some alkoxy group (OR) can be left over as well from the production process (C. J. Brinker, G. W. Scherer, *Sol-Gel Science*, 1990, chapter 10).

If an IR opacifier, for example carbon black, titanium dioxide, iron oxides or zirconium dioxide, is added to the sol before gelmaking, the radiative contribution to thermal conductivity can be reduced.

For color, dyes and/or color pigments can optionally be added.

The fibers used in step b) are subject to the above remarks.

The fibers can be coated with a suitable size to improve their dispersibility or the wetting of the web. The coating can also be used to improve the binding of the gel to the fibers.

The conversion of the sol into a gel (step c) can be effected for example by hydrolysis and condensation of silicon or aluminum alkoxides, gelling of particulate or colloidal silicon or aluminum oxide or a combination of these methods. The preparation of silicon-containing gels is described for example in WO 93/06044. The preparation of organic gels is described for example in U.S. Pat. No. 5,086,085 and U.S. Pat. No. 4,873,218.

If an aqueous sol was used in step a) and the pH was changed with a mineral acid, the sol should be washed with water until electrolyte-free.

The addition of the fibers, especially in the case of individual fibers, can also take place during gel formation, when the sol has already attained a high viscosity but is not yet solid.

The gel is deformed in step d) in such a way that cracks form ideally over the entire area to define fiber connected fragments bounded thereby. For this, the bending should take place in the same direction not only with respect to the gel surface but also with respect to the gel subface. This is advantageously achievable by guiding the gel around rotatable rolls or deflecting rollers. Particularly uniform fragments are obtained on effecting the deformation in two mutually perpendicular directions.

The average volume of the fragments can be controlled in a specific manner through the choice of roll diameter and the firmness of the gel (for example via the gel aging) when the cracks are produced by guiding around rolls. The roll diameter is preferably 2 to 10 cm for the formation of fragments of the aforementioned average volume. The smaller the diameter of these rollers, the smaller the average volume of the fragments and the greater the mechanical flexibility of the composite.

It is advantageous to allow the gel obtained in step c) or d) to age in order to increase the gel firmness. The aging of the gel generally takes place at a temperature of 20° C. to the boiling point of the liquid present in the gel. If, for example, the gel liquid is water and the gel matrix SiO$_2$, then the aging process generally takes place at 20° to 90° C., preferably 20° to 70° C., at a pH of 6 to 11, preferably 6 to 9, in the course of 1 minute to 48 hours, in particular 15 minutes to 24 hours.

The gel present in the liquid can be exchanged in at least one washing process (step d) for the same or for another liquid which is suitable for the subsequent drying in step e).

The deformation of the gel can advantageously be carried out during the replacement of the liquid in step d).

Steps a) to d) are generally carried out at a temperature between the freezing point of the liquid present in the gel and 70° C., but at not more than the boiling point of the liquid present in the gel.

Advantageously, the gel obtained in step d) can be dried subcritically to form an aerogel composite. The drying process comprises e1) reacting the gel obtained in step d) with one or more surface-modifying substances in such a way that a sufficiently large proportion of the surface groups of the gel is replaced by groups of the surface-modifying substance as to substantially suppress any further condensation between the surface groups on various pore surfaces and/or reduce the capillary forces by changing the contact angle between pore surface and the liquid from which the drying takes place, e2) optionally exchanging the liquid present in the gel, and e3) drying the resulting gel at a temperature below the critical temperature of the liquid present in the gel and a pressure of 0.001 bar to the vapor pressure of this liquid at this temperature.

In step d), a liquid suitable for the subsequent process steps has to be used for washing. If the gel contains for example water, it is advisable to wash the gel with a protic or aprotic organic solvent until the water content of the gel is ≦5% by weight, preferably ≦2% by weight.

The organic solvents used are generally ethers, esters or ketones and also aliphatic or aromatic hydrocarbons. Preferred solvents are methanol, ethanol, acetone, tetrahydrofuran, ethyl acetate, dioxane, n-hexane, n-heptane and toluene. It is also possible to use mixtures of the aforementioned solvents. The solvent has to be substantially inert with respect to the surface-modifying substance used in the subsequent step.

The surface-modifying substances used in step e1) convert a large proportion of the hydrophilic or reactive surface groups on the pore surfaces into hydrophobic surface groups or surface groups which are unsuitable for further condensation.

As a consequence, further condensation between groups on different pore surfaces is suppressed and the capillary forces are reduced through a change in the contact angle between pore wall and the meniscus of the liquid from which the drying takes place.

When the gel is a silicon oxide gel, an aluminum oxide gel or a silicon aluminum oxide gel, the original surface groups present are generally groups of the formula MOH or MOR where M is Al or Si and R is $C_1$–$C_6$-alkyl, preferably methyl or ethyl. Reaction with surface-modifying substances of the general formula $R'_n MX_m$ replaces the original surface groups with inert groups of the type $MR'_n$. Here n and m are integers greater than zero whose sum corresponds to the valence of M. R' is hydrogen or a nonreactive organic linear, branched, cyclic, aromatic or heteroaromatic radical such as, for example, $C_1$–$C_{18}$-alkyl, preferably $C_1$–$C_6$-alkyl, and preferably methyl or ethyl, cyclohexyl or phenyl; each R' is independently identical to or different from the others and can be bridged. Furthermore, X is halogen, preferably Cl, or a radical —OR", —SR" or —NR"$_2$, where R" is a straight-chain or branched, identically or differently mono- or polysubstituted aliphatic radical $C_1$ to $C_{18}$ in which one or more $CH_2$ groups can be replaced by —C≡C—, —CH=CH—, —COO—, —O(C=O)—, SiR'"$_2$—, —CO—, phenylenediyl and/or up to every second $CH_2$ unit can be replaced by O or NR"' where R"' is phenyl, $C_1$–$C_{18}$-alkyl or benzyl, or R" is a benzyl radical or phenyl radical which can be substituted by 1 to 5 substituents R', OH, OR', COOR', OCOR', $SO_3H$, $SO_2Cl$, F, Cl, Br, $NO_2$ or CN; and in the case of N, each R" is independently identical to or different from the others. If m is at least two, each X is independently identical to or different from the others or bridged. It is also possible to use mixtures of the surface-modifying substances.

Preference is given to using silylating agents of the formula $R'_{4-n}SiCl_n$ or $R'_{4-n}Si(OR")_n$ where n is 1 to 3 and R' and R" are each as defined above. Silazanes are also suitable. Preference is given to using methyltrichlorosilane, dimethyldichlorosilane, trimethylchlorosilane, trimethylmethoxysilane or hexamethyldisilazane.

The silylated gel is preferably washed in step e2) with a protic or aprotic solvent until the unconverted surface-modifying substance is essentially removed (residual level≦1% by weight). Suitable solvents are those mentioned for step d). Similarly, the solvents mentioned there as prefered are also prefered here.

In step e3), in a special embodiment, the fiber-reinforced, surface-modified gel is dried at temperatures of –30° to 200° C., preferably 0° to 100° C., and a pressure of 0.001 to 20 bar, preferably 0.01 to 5 bar, particularly preferably 0.1 to 2 bar. Higher temperatures than 200° C. and/or higher pressures than 20 bar are readily possible, but they are associated with unnecessary effort and do not afford any advantages. The drying is generally carried on until the gel has a residual solvent content of less than 0.1% by weight. Suitable drying processes include for example contact drying and convection drying.

In addition, the drying of the gel can be significantly speeded up by using dielectric drying processes, for example microwave drying. For this, following the surface modification, the solvent is if necessary exchanged in step e2) for a solvent which is an efficient absorber of microwaves, such as, for example, water, ethanol or preferably acetone. The gels can then be rapidly dried in a microwave dryer.

Solvent exchange and drying are particularly advantageous for gels having a thickness between 0.5 and 5 mm, since the solvent exchange time and the drying time are essentially determined by diffusion of the solvent or solvent vapor.

Preference is given to a process for producing $SiO_2$ aerogel composites of this invention, which comprises a) adjusting an aqueous waterglass solution ($SiO_2$ concentration generally ≦10% by weight, preferably ≦7% by weight) to a pH ≦3, for example with the aid of an acidic ion exchange resin or a mineral acid, and adding a base, generally $NH_4OH$, NaOH, KOH, $Al(OH)_3$ and/or colloidal silica, to the resulting silicic acid, b) adding fibers, c) allowing the silicic acid to polycondense, d) subjecting the gel to a suitable deformation process to introduce cracks into it in a specific manner to form fiber-connected fragments having an average volume of 0.001 $mm^3$ to 1 $cm^3$, the gel being washed with an organic solvent before, during and/or after the deformation until the water content of the gel is ≦5% by weight, e1) reacting the gel obtained in step d) with a silylating agent, e2) optionally washing the silylated gel with an organic solvent until the residual level of unconverted silylating agent is ≦1% by weight, and e3) drying the silylated gel obtained in step e1 or e2) at –30° to 200° C. and 0.001 to 20 bar.

Step a) is preferably carried out using an acidic ion exchange resin.

The composite thus obtained is hydrophobic when the surface groups applied by the surface modification are hydrophobic, as is the case when using trimethylchlorosilane, for example. The hydrophobicity can subsequently be reduced for example by expulsion or partial pyrolysis.

Alternatively, in step e), the gel obtained in step d) can be dried for example by converting the liquid present in the gel into a supercritical state and then removing the liquid from the solid by flash vaporization at supercritical temperature to form an aerogel composite. For this, a liquid suitable for the drying, for example liquid $CO_2$ or methanol, has to be used for the exchange in step d). Typical processes for supercritical drying from $CO_2$ are described for example in U.S. Pat. No. 4,610,863 or in Bommel M. J., de Haan A. B., *Journal of Materials Science*, 29, (1994), 943–948, and from methanol in EP-B-0396076 or WO 93/06044.

To obtain a hydrophobic aerogel at the end, it is possible, between step d) and e), optionally after the solvent exchange, to react the gel with a surface-modifying substance which leads to a hydrophobicization of the surface. If necessary, following this step, the solvent may have to be exchanged once more for a liquid suitable for drying. Suitable for this purpose are for example the abovementioned substances and processes for surface modification. However, advantageously the reaction can also take place in the gas phase after drying.

The advantage of the process of this invention over a deformation of a previously dried, fiber-reinforced aerogel resides in a more uniform formation of fragments and in that a deformation in the gel state would typically not spall off any fragments.

The composites thus obtained are visually uniform because of the similarity in size of the fragments.

The bending stiffness of the composites can be varied through the choice of fiber material used and the degree of bending after gel formation. By joining thin aerogel mats of this invention together, for example by incorporation into a suitable sleeve, by adhesion or by suitable mechanical bonding such as clipping or sewing, they can be strengthened. The surface of the composite can be laminated with materials known to the person skilled in the art, for example polymeric films, paper, webs or wovens.

The composites of this invention have low thermal conductivity making them suitable for use as thermal insulating materials.

When transparent fibers such as, for example, glass fibers are used, the mat remains translucent and can therefore be used as transparent thermal insulation. Suitable choice of a fiber material and of distribution can be used to alter on the one hand the translucence, on the other to achieve a decorative effect.

In addition, they can be used as sound absorption materials directly or in the form of resonance absorbers, since they have a low sound velocity and, compared with monolithic aerogels, a high sound damping capacity. Specific alteration of the average volume of the fragments and hence of the number of cracks makes it possible to increase the porosity of the material and hence the degree of sound damping.

SHORT DESCRIPTION OF THE DRAWING

FIG. 1 shows a schematic representation of a pore 1 approximately half filled with liquid 2 and vapor 4, the contact angle θ between liquid meniscus and pore wall 3, and the radius r of the pore.

EXAMPLE 1

Tetraethyl orthosilicate (TEOS) was used to produce aerogel mats by the following process:
100 ml of TEOS, 100 ml of ethanol, 7.98 ml of distilled water and 0.33 ml of 1M HCl were added together and refluxed for 1.5 to 2 hours.

10 parts of the sol were admixed with one part of 0.5M $NH_4OH$ solution and poured into petri dishes over a polyester web composed of 50% each of 0.9 dtex and 1.7 dtex TREVIRA® 290, having a density of 15 kg/m³ and needled with 150 stitches/cm². The amount was sufficient to just cover the fibers. The gel time was about 20 minutes. The samples were kept tightly sealed during that period. The aging of the gel was brought about by heating at 50° C. for 24 hours.

The gel plate thus prepared was then wound around a glass cylinder 3 cm in diameter. The plate was wound around the cylinder once with the surface facing the cylinder and once with the subface facing the cylinder. Thereafter the process was repeated once more with the plate turned through 90°.

The aged gel cooled down to room temperature was introduced into ethanol and then heated to 50° C. for 1 hour. This process was repeated twice with fresh ethanol and then once with n-hexane. Thereafter the n-hexane was exchanged three times, and the sample was stored at 50° C. for a further 24 hours. The gel plate thus formed was then wound around a glass cylinder 3 cm in diameter, first with the surface of the plate facing the cylinder and then with the subface of the plate facing the cylinder. Thereafter the process was repeated with the gel plate turned through 90°. The moist gel was then admixed with 10% by weight of trimethylchlorosilane TMCS) and stored at 50° C. for 24 hours. Thereafter the TMCS residues were washed out twice with n-hexane at 50° C. for 1 hour each time.

The drying was then carried out in three stages at 37° C., 50° C. and 140° C. for 24 hours each time. The aerogel composite has a fragment volume of 3.5 mm³. The thermal conductivity was measured with a hot wire method (see, for example, O. Nielsson, G. Rüschenpöhler, J. Groβ, J. Fricke, *High Temperatures—High Pressures*, Vol. 21, 267–274 (1989)). The result was a value of 22 mW/mK. The modulus was measured with a three-point bending method (see, for example, G. W. Scherer, S. A. Pardenek, R. M. Swiatek, J. *Non-Crystalline Solids*, Vol. 107 14–22 (1988)). The, result was a value of 1.3 MPa, i.e. a very flexible aerogel mat compared with a prior art aerogel.

The aerogel mat did not break at a certain tension during the three-point bending test, but only deformed irreversibly at high loads.

EXAMPLE 2

The experiments were carried out as in Example 1 except that a glass cylinder 10 cm in diameter was used. The aerogel composite had a fragment volume of 8 mm³. Thermal conductivity and modulus were determined as in Example 1. The thermal conductivity value obtained was 20 mW/mK, the modulus 2 MPa.

The aerogel mat did not break at a certain tension during the three-point bending test, but only deformed irreversibly at high loads.

EXAMPLE 3

Waterglass was used as the basis for the production of aerogel mats by the following process:

A glass fiber web having a basis weight of 300 g/m² and a thickness of 3 mm (PolyMat-Glasnadelmatte Typ G300 from Schuller, Wertheim) was calcined at 50° C. for 1 hour.

1 l of a sodium waterglass solution (containing 8% by weight of $SiO_2$ and an $Na_2O:SiO_2$ weight ratio of 1:3.3) was stirred together with 0.5 l of an acidic ion exchange resin (styrene-divinylbenzene copolymer with sulfonic acid groups, commercially available under the name ®Duolite C20) until the aqueous solution had reached a pH of 2.7. The ion exchange resin was then filtered off and the aqueous solution was adjusted to a pH of 4.8 with 1M NaOH solution. The web was introduced into a mold and the sol was poured on top of it to cover all of the web. The mold was then tightly closed and stored at 85° C. for 5 hours in a drying cabinet.

The gel plate thus prepared was then wound around a glass cylinder 10 cm in diameter. The plate was wound round the cylinder once with the surface facing the glass cylinder and once with the subface facing the glass cylinder. Thereafter the process was repeated once more with the plate turned through 90°.

The mats were then washed with acetone until the water content was below 0.5% by weight. The moist gel was admixed with 10% by weight of trimethylchlorosilane (TMCS) and stored at room temperature for 24 hours. Thereafter it was washed a further six times with acetone. Drying took place in two stages, 24 hours at 50° C. and 850 mbar pressure, then 12 hours at 140° C. and 50 mbar pressure.

The density of the composite material was 0.25 g/cm$^3$. Thermal conductivity and modulus were determined as in Example 1. The thermal conductivity value found was 18 mW/mK, the modulus 2 MPa.

The aerogel mat did not break at a certain tension during the three-point bending test, but only deformed irreversibly at high loads.

What is claimed is:

1. A mat-shaped composite comprising an aerogel having porosities above 60% and densities below 0.6 g/cm$^3$ and fibers dispersed therein, the aerogel having cracks and the aerogel fragments enclosed by the cracks, whose average volume is 0.001 mm$^3$ to 1 cm$^3$, being held together by the fibers.

2. The composite of claim 1, wherein the aerogel contains SiO$_2$ groups.

3. The composite of claim 1, wherein the volume proportion of fiber is 0.1 to 30%.

4. The composite of claim 1, wherein the fiber diameter is
   a) 0.1 to 30 μM in the case of non-metallized fiber and/or
   b) 0.1 to 20 μm in the case of metallized fiber.

5. The composite of claim 1, wherein the fibers are present in the form of webs or mats.

6. The composite of claim 5, comprising at least two mats firmly joined together adhesively, mechanically or held together by a sleeve.

7. The composite of claim 5, wherein at least one mat is laminated on at least one side of said composite.

8. The composite of claim 1, wherein the fibers are present individually and in random or oriented form and their length is greater than 1 cm.

9. The composite of claim 1, further comprising an Infra-red opacifier.

10. The composite of claim 1, being hydrophobic.

11. A process for producing a composite as claimed in claim 1, which comprises:
    a) preparing a sol,
    b) adding fibers to the sol,
    c) converting the sol obtained in b) into a gel,
    d) subjecting the gel to a deformation process to introduce cracks into it in a manner to form fiber-connected fragments having an average volume of 0.001 mm$^3$ to 1 cm$^3$ with or without the liquid present in the gel being exchanged before, during and/or after the deformation, and
    e) drying the deformed gel obtained in d) so as to obtain an aerogel.

12. The process of claim 11, wherein the gel obtained in step c) or d) is aged at a temperature of 20° C. to the boiling point of the liquid present in the gel.

13. The process of claim 11 for producing an aerogel composite, which comprises
    e1) reacting the gel obtained in step d) with one or more surface-modifying substances such that a sufficiently large proportion of the surface groups of the gel is replaced by groups of the surface-modifying substance as to substantially suppress any further condensation between the surface groups on various pore surfaces and/or reduce the capillary forces by changing the contact angle between pore surface and the liquid from which the drying takes place,
    e2) optionally exchanging the liquid present in the gel, and
    e3) drying the resulting gel at a temperature below the critical temperature of the liquid present in the gel and a pressure of 0.001 bar to the vapor pressure of this liquid at this temperature.

14. The process of claim 13, wherein the gel is reacted in step e1) with at least one surface-modifying substance of the general formula R'$_n$MX$_m$, where R' is hydrogen or a nonreactive, organic, linear, branched, cyclic, aromatic or heteroaromatic radical, each R' being independently identical to or different from the others, M is Al or Si, X is a halogen or a radical —OR", —SR" or —NR"$_2$, where R" is a straight-chain or branched, identically or differently mono- or polysubstituted aliphatic radical C$_1$ to C$_{18}$ in which one or more CH$_2$ groups can be replaced by —C≡C—, —CH=CH—, —COO—, —O(C=O)—, SiR"'$_2$—, —CO—, phenylenediyl and/or up to every second CH$_2$ unit can be replaced by O or NR"' where R"' is phenyl, C$_1$-C$_{18}$-alkyl or benzyl, or R" is a benzyl radical or phenyl radical which can be substituted by 1 to 5 substituents R', OH, OR', COOR', OCOR', SO$_3$H, SO$_2$Cl, F, Cl, Br, NO$_2$ or CN; and in the case of N each R" is independently identical to or different from the others, n and m are integers greater than zero whose sum corresponds to the valence of M, each X being identical to or different from the others for m≥2.

15. The process of claim 11 for producing an aerogel composite, wherein the gel obtained in step d) is dried by
    e1) converting the liquid present in the gel into a supercritical state and then
    e2) removing the liquid by flash vaporization at supercritical temperature.

16. A thermal insulating material and/or sound absorption material comprising the composite of claim 1.

17. A process for producing SiO$_2$ aerogel mats having porosities greater than 60% by volume and densities less than 0.6 g/cm$^3$, which comprises
    a) adjusting an aqueous waterglass solution to a pH≤3 and adding a base to the resulting silicic acid,
    b) adding fibers,
    c) allowing the silicic acid to polycondense,
    d) subjecting the gel to a deformation process to introduce cracks into it in a manner to form fiber-connected fragments having an average volume of 0.001 mm$^3$ to 1 cm$^3$, the gel being washed with an organic solvent before, during and/or after the deformation until the water content of the gel is ≤5% by weight,
    e1) reacting the gel obtained in step d) with a silylating agent,
    e2) optionally washing the silylated gel with an organic solvent until the residual level of unconverted silylating agent is ≤1% by weight, and
    e3) drying the silylated gel obtained in step e1) or e2) at −30° to 200° C. and 0.001 to 20 bar.

18. The process of claim 17, wherein the drying of the gel in step e3) is effected by means of a dielectric process.

19. The process of claim 18, wherein the gel is dried by microwaves.

* * * * *